(12) United States Patent
Lai et al.

(10) Patent No.: US 8,427,143 B2
(45) Date of Patent: Apr. 23, 2013

(54) FIXING STRUCTURE FOR SIGNAL WIRES OF A RESOLVER

(75) Inventors: Ming-Chih Lai, Taichung (TW); Chi-Lu Li, Taichung (TW); Chih-Yu Wang, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 254 days.

(21) Appl. No.: 13/042,347

(22) Filed: Mar. 7, 2011

(65) Prior Publication Data

US 2012/0229124 A1    Sep. 13, 2012

(51) Int. Cl.
*G01B 7/30* (2006.01)

(52) U.S. Cl.
USPC .................................................. 324/207.25

(58) Field of Classification Search ............. 324/207.25
See application file for complete search history.

*Primary Examiner* — Reena Aurora

(57) ABSTRACT

A fixing structure for signal wires of a resolver is disposable on an end face of a stator of the resolver. The fixing structure includes a circuit board, a fixing section disposed on the circuit board for connecting the circuit board to the end face of the stator, a connection terminal seat disposed on the circuit board, multiple connection sections formed through the circuit board in the form of holes, and multiple bridge circuits respectively arranged between the corresponding connection sections and the connection terminal seat for bridging the corresponding connection sections and the connection terminal seat.

1 Claim, 5 Drawing Sheets

US 8,427,143 B2

FIXING STRUCTURE FOR SIGNAL WIRES OF A RESOLVER

BACKGROUND OF THE INVENTION

1. Field of the Invention

The present invention relates generally to a resolver, and more particularly to a fixing structure for signal wires of a resolver.

2. Description of the Related Art

A resolver is used as a feedback device of a feedback motor for feeding back angular position thereof. The resolver works in the principle that the energizing coil of the stator generates an energizing signal to have a flux linkage with the rotor. Then the induction coil of the stator creates an induced magnetic field to output an induction signal. The coils of the stator are formed generally by means of winding wires on the poles of the stator. The coils wound on the poles of the stator need to be further electrically connected to an exterior side. Therefore, after wound, the coils must be electrically connected to the exterior side via a connection member.

FIGS. 1 and 2 show a conventional connection member 1 for electrically connecting the coils with the exterior side. The connection member 1 is composed of a fixed contact pin section 2 and a movable contact pin section 3. The fixed contact pin section 2 is fixedly disposed in a space between two adjacent poles 5 of the stator 4. The ends of the wires of the stator coils 6 are electrically connected with the fixed contact pin section 2. The movable contact pin section 3 can be connected with the fixed contact pin section 2 by insertion to electrically connect the fixed contact pin section 2 to the exterior side.

The stator coils can be electrically connected to the exterior side by means of the conventional connection member 1. However, the fixed contact pin section 2 must be located in the limited space between the adjacent poles 5. In the case of a stator with numerous poles, it is impossible to arrange the fixed contact pin section 2 in the narrow space between the adjacent poles 5. Moreover, when the winding process of the stator coils 6 is completed, the end of the wire of the coil is not positioned in the same position as the fixed contact pin section 2. Therefore, it is necessary to connect the end of the wire to the fixed contact pin section 2 via an extension lead 7. In this case, it is necessary to keep the extension lead 7 and fix the extension lead 7 to an end face of the stator by means of an insulation adhesive. Then, the extension lead 7 is extended to connect with the fixed contact pin section 2. Accordingly, the wire keeping process is troublesome to complicate the manufacturing process. Furthermore, in operation, the motor will generate high heat to make the temperature rise. Under the high temperature, the insulation adhesive will detach from the end face of the stator. Under such circumstance, the extension lead 7 will deflect or even detach from the end face of the stator to cause abrasion and damage.

SUMMARY OF THE INVENTION

It is therefore a primary object of the present invention to provide a fixing structure for signal wires of a resolver. With the fixing structure, after the coils are wound on the stator of the resolver, the requirement of wire keeping can be minimized so as to simplify the manufacturing process of the resolver.

It is a further object of the present invention to provide the above fixing structure for signal wires of the resolver. With the fixing structure, after the coils are wound on the stator of the resolver, the outward extending ends of the coils can be extended into the corresponding connection sections by shortest distance. Accordingly, the length of the extension lead can be shortened to reduce the amount of redundant wires.

To achieve the above and other objects, the fixing structure for signal wires of the resolver of the present invention is disposable on an end face of a stator of the resolver. The fixing structure includes a circuit board, a fixing section disposed on the circuit board for connecting the circuit board to the end face of the stator, a connection terminal seat disposed on the circuit board, multiple connection sections formed through the circuit board in the form of holes, and multiple bridge circuits respectively arranged between the corresponding connection sections and the connection terminal seat for bridging the corresponding connection sections and the connection terminal seat.

The present invention can be best understood through the following description and accompanying drawings, wherein:

DETAILED DESCRIPTION OF THE PREFERRED EMBODIMENTS

Figure 1:
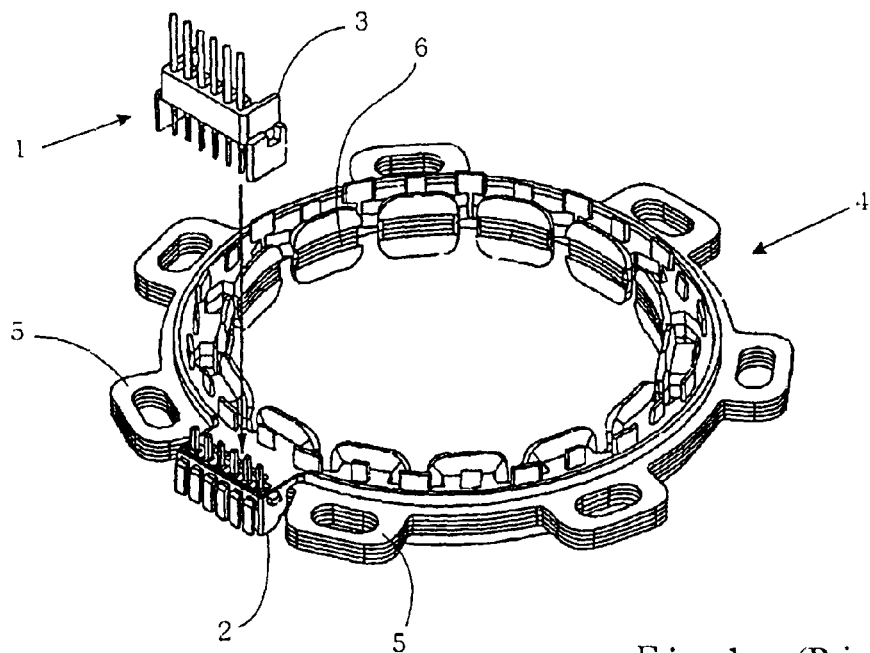
FIG. 1 is a perspective view showing that a conventional connection member is used to electrically connect the coils of a stator with the exterior side.
Figure 2:
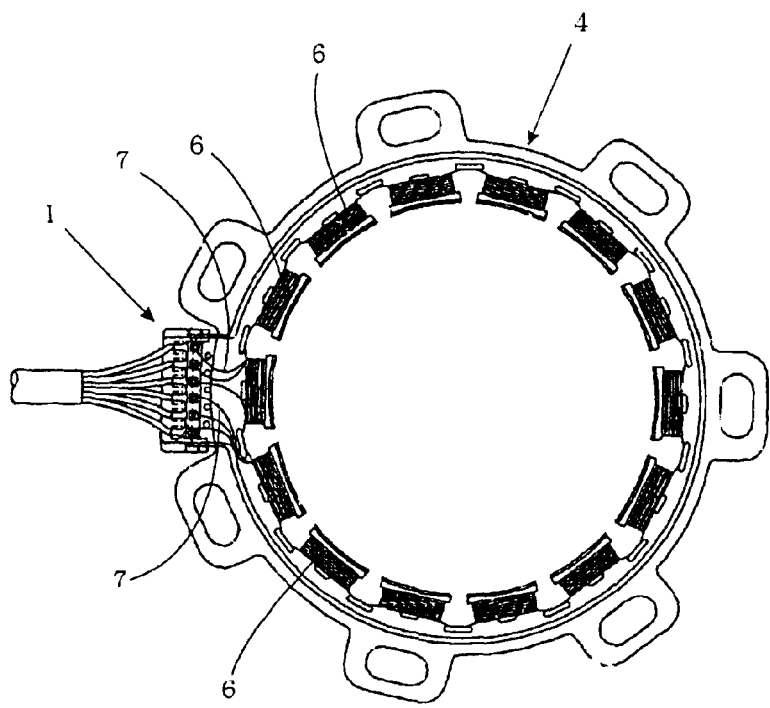
FIG. 2 is a plane view according to FIG. 1.
Figure 3:
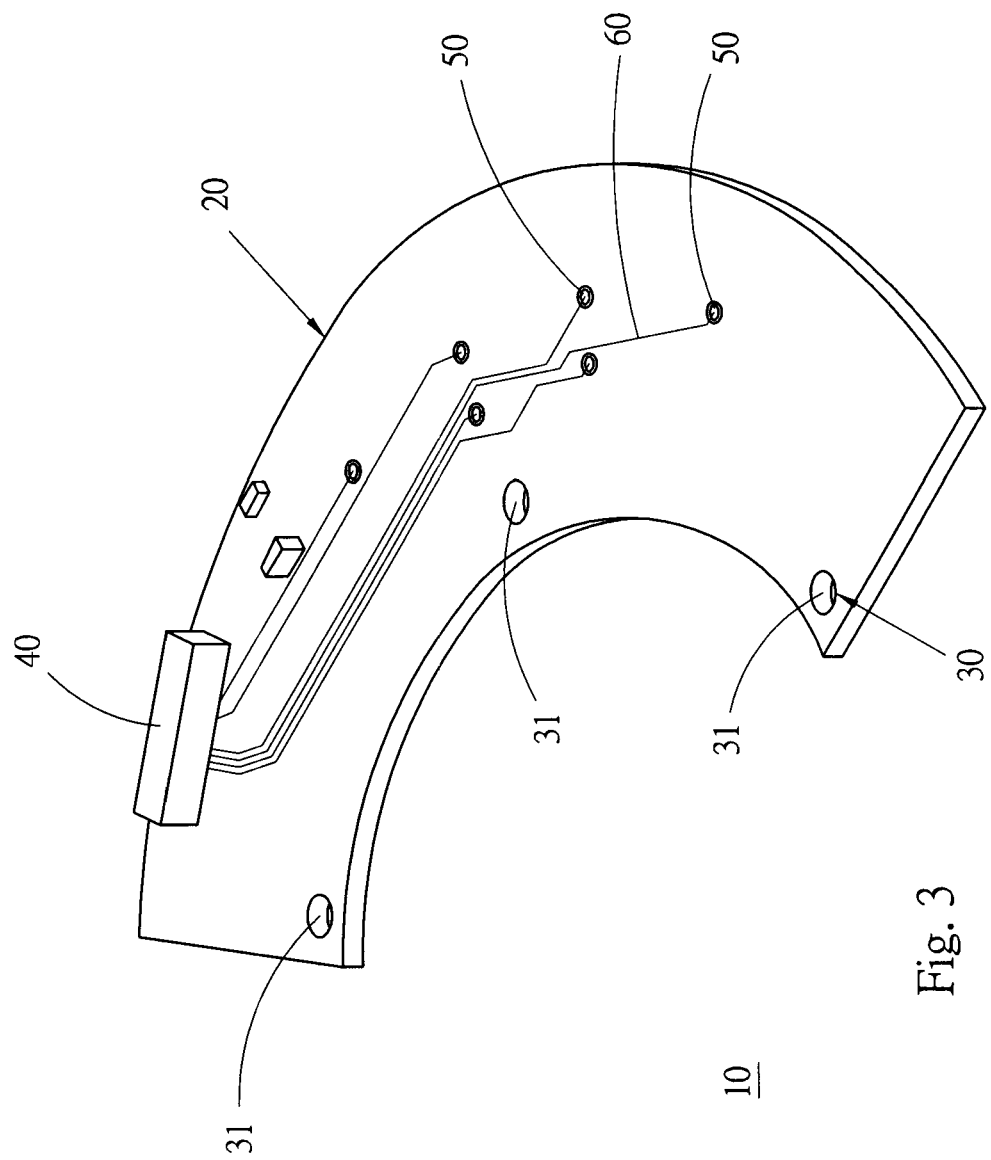
FIG. 3 is a perspective view of a preferred embodiment of the present invention.

Please refer to FIGS. 3 to 6. According to a preferred embodiment, the fixing structure 10 for signal wires of a resolver of the present invention includes a circuit board 20, a fixing section 30, a connection terminal seat 40, multiple connection sections 50 and multiple bridge circuits 60.

The circuit board 20 is substantially an arcuate board member having a first board face 21 and a second board face 22. The first board face 21 is attached to an end face 71 of a resolver stator 70. The circuit board 20 has a curvature center coinciding with an axis of the stator 70. The circuit board 20 is such sized as to cover multiple coils 72 wound on the stator 70 and having outward extending ends. The outward extending ends are positioned within a projective range of the first board face 21 of the circuit board 20.

The fixing section 30 is used to fix the circuit board 20 with the end face 71 of the stator. The fixing section 30 has three fixing holes 31 formed through the circuit board 20 between the first and second board faces 21, 22 thereof. Three fastening bolts (not shown) are respectively passed through the fixing holes 31 and screwed with the stator 70. Accordingly, the circuit board 20 is fixed on the end face 71 of the stator 70.

The connection terminal seat 40 is fixedly disposed on the second board face 22 of the circuit board 20. The connection terminal seat 40 can be electrically connected to the exterior side via an external plug. Such socket and plug technique pertains to prior art and is not included in the scope of the present invention and thus will not be further described hereinafter.

The connection sections 50 are in the form of through holes, which pass through the circuit board 20 between the first and second board faces 21, 22 thereof. To speak more specifically, the connection sections 50 are electroplated through holes the walls of which are electroplated with conductive coatings. The connection sections 50 are positioned where the outward extending ends (not shown) of the wires of the coils are positioned.

The bridge circuits 60 are disposed on the second board face 22 of the circuit board 20 for respectively bridging the corresponding connection sections 50 to the connection terminal seat 40.

In use, when fixing the signal wires of the resolver with the signal wire fixing structure 10, the circuit board 20 is fixed to the end face of the stator 70 by means of the fixing section 30. After the coils are wound on the stator 70, the outward extending ends of the wires of the coils are extended into the corresponding connection sections 50. Then, by means of a conventional fixing technique such as soldering, the outward extending ends are fixedly connected in the connection sections 50. Accordingly, the outward extending ends can be connected to the connection terminal seat 40 via the bridge circuits 60. In this case, the external plug can be plugged into the connection terminal seat 40 to electrically connect the outward extending ends to the exterior side.

Figure 4:
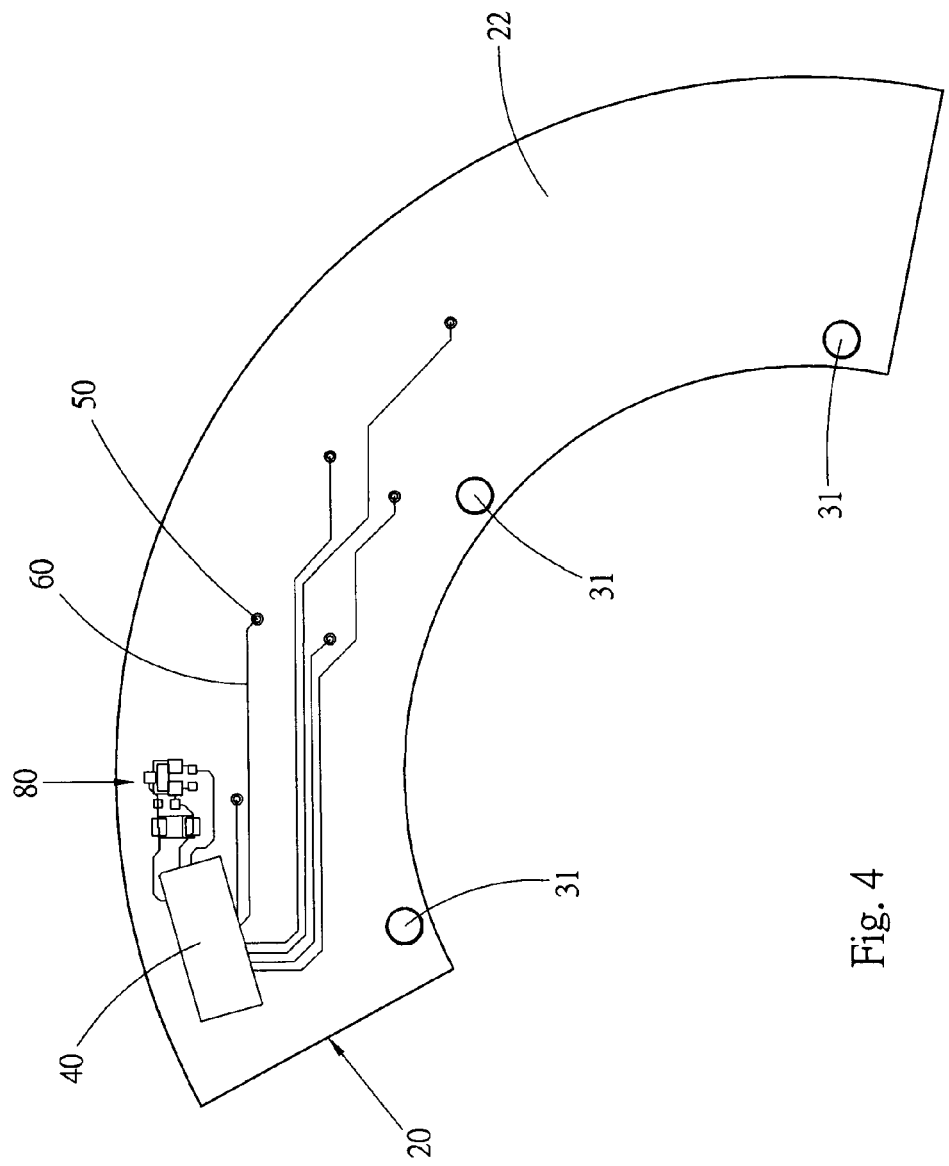
FIG. 4 is a top view of the preferred embodiment of the present invention.
Figure 5:
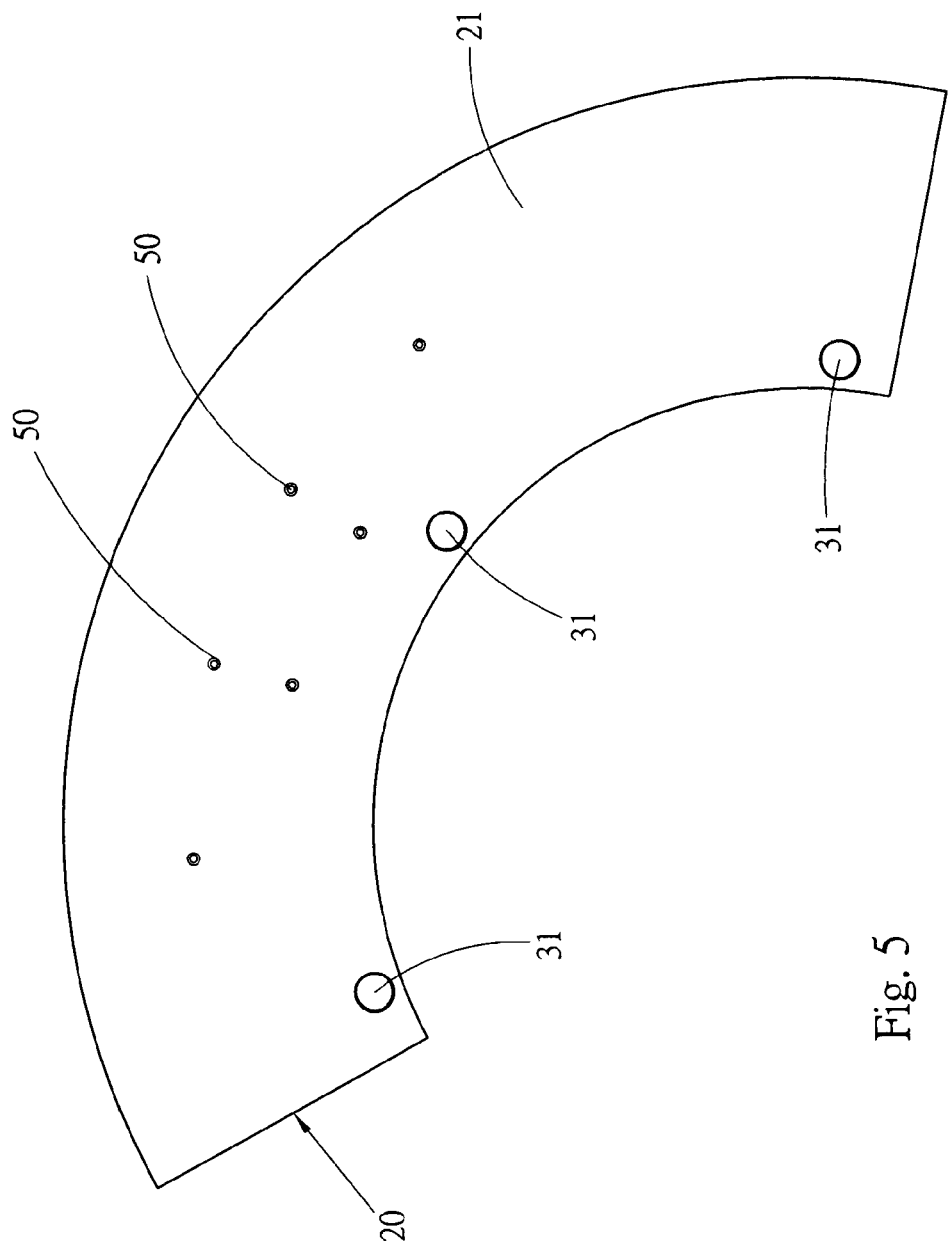
FIG. 5 is a bottom view of the preferred embodiment of the present invention.
Figure 6:
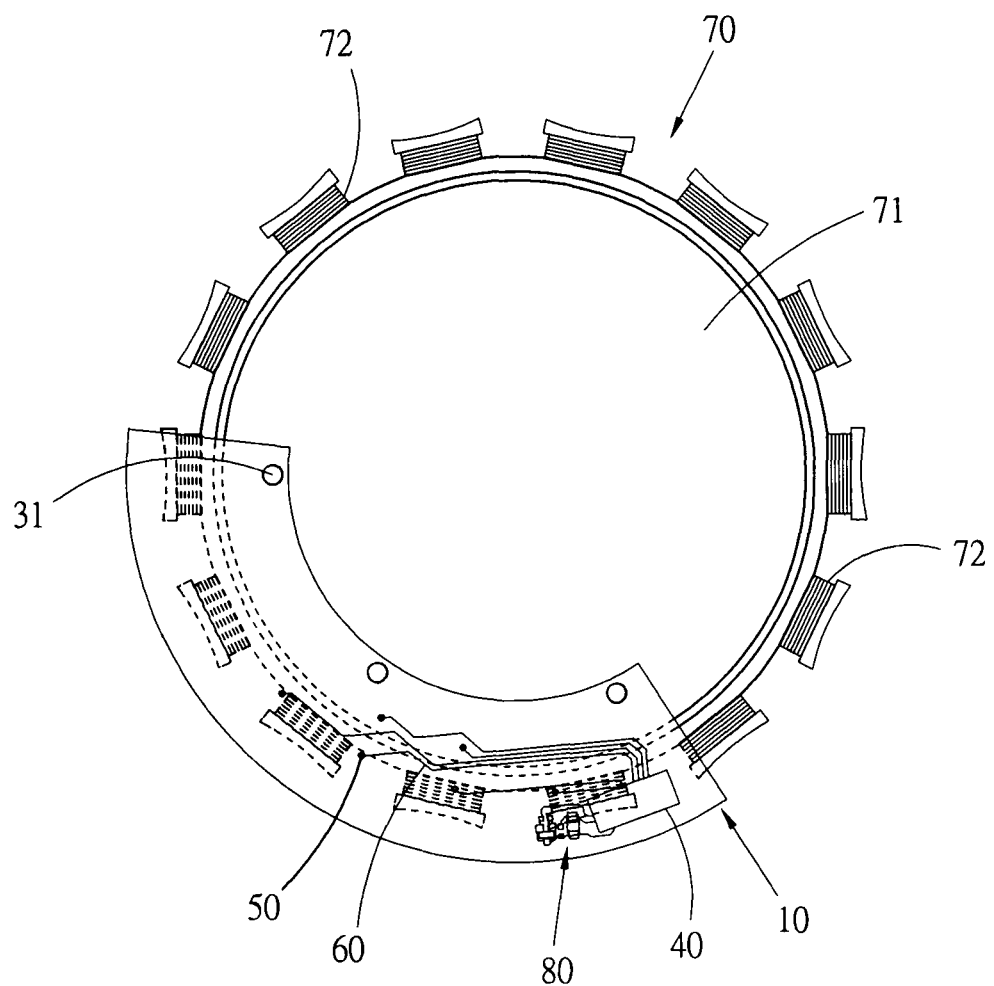
FIG. 6 is a top view of the preferred embodiment of the present invention, showing the use thereof.

According to the above arrangement, in comparison with the conventional technique, the fixing structure 10 for signal wires of the resolver of the present invention at least has the following advantages:
1. The circuit board 20 is attached to the end face 71 of the stator 70 rather than positioned between the adjacent poles of the stator as in the conventional technique. Therefore, the fixing structure 10 for signal wires of the resolver is not only applicable to the stator with few poles, but also is applicable to the stator will numerous poles to achieve the function of fixing the signal wires of the resolver.
2. The circuit board 20 is not limited by the space between the adjacent poles as in the conventional technique. Therefore, the circuit board 20 can be such sized as to cover different poles. In other words, the circuit board 20 has a specifically enlarged size sufficient to cover the positions of multiple outward extending ends of the coils of the stator 70. Accordingly, the outward extending ends can be extended into the corresponding connection sections 50 by shortest distance. In comparison with the conventional technique, the length of the extension lead is greatly shortened and the requirement of wire keeping can be minimized. Moreover, it is unnecessary to use any adhesive to fix the extension lead. Therefore, the problem of detachment of the extension lead under high temperature in operation of the motor can be eliminated to ensure reliability of the product.
3. The bridge circuits 60 are positioned on the second board face 22 of the circuit board 20 distal from the stator 70. In this case, a short-circuit between the bridge circuits 60 and the coils of the stator 70 or the outward extending ends can be avoided so as to ensure reliability of the product.
4. The electronic components of the resolver, such as Hall sensors, can be directly combined with the circuit board 20 of the fixing structure 10 for signal wires of the resolver. That is, as shown in FIG. 4, connection circuits 90 can be laid out beside the connection terminal seat 40 for connecting with the electronic components. Accordingly, the electronic components with different functions can be combined with the circuit board 20 to simplify the components of the resolver.

The above embodiments are only used to illustrate the present invention, not intended to limit the scope thereof. Many modifications of the above embodiments can be made without departing from the spirit of the present invention.

What is claimed is:

1. A fixing structure for signal wires of a resolver, which is disposable on an end face of a stator of the resolver, the fixing structure comprising:
   an arcuate circuit board having a first board face and a second board face, the first board face being attached to the end face of the stator, the circuit board being such sized as to cover the positions of outward extending ends of multiple coils of the stator, the circuit board having a curvature center coinciding with an axis of the stator;
   a fixing section having multiple fixing holes formed through the circuit board, multiple fastening bolts being respectively passed through the corresponding fixing holes and screwed with the stator of the resolver;
   a connection terminal seat disposed on the second board face of the circuit board;
   multiple connection sections in the form of through holes, the connection sections being electroplated through holes formed through the circuit board, the connection sections being positioned where the outward extending ends of the coils of the stator are positioned; and
   multiple bridge circuits disposed on the second board face of the circuit board and respectively bridged between the corresponding connection sections and the connection terminal seat.

* * * * *